Nov. 12, 1968 J. K. WARE 3,410,350
APPARATUS FOR HARVESTING SPRIGS
Filed March 3, 1966 2 Sheets-Sheet 1

INVENTOR.
James K. Ware
BY
Jennings, Carter & Thompson
Attorneys

INVENTOR.
James K. Ware
BY
Jennings, Carter & Thompson
Attorneys

# United States Patent Office 3,410,350
Patented Nov. 12, 1968

3,410,350
APPARATUS FOR HARVESTING SPRIGS
James K. Ware, Rte. 4, Box 105–G,
Columbus, Miss. 39701
Filed Mar. 3, 1966, Ser. No. 531,396
12 Claims. (Cl. 172—32)

ABSTRACT OF THE DISCLOSURE

This invention relates to apparatus for harvesting sprigs and more particularly to apparatus for harvesting sprigs from sod, such as coastal Bermuda, turf grasses and the like.

---

An object of my invention is to provide apparatus for harvesting sprigs in which the sprigs are separated from the sod by high speed, impact members which disintegrate the sod immediately upon movement of the sod into a separator housing, thereby initially separating a major portion of the sod materials from the sprigs to bring about an efficient operation due to the fact that the sod materials, other than sprigs, are immediately returned to the ground.

Another object of my invention is to provide apparatus for harvesting sprigs of the character designated in which the sprigs harvested are very clean and uniform in length, increasing the number of sprigs per unit volume, thus reducing the amount of soil to be handled with the sprigs during subsequent operations and at the same time greatly increasing the number of usable sprigs harvested.

Another object of my invention is to provide apparatus for harvesting sprigs of the character designated in which improved rotary beater elements are employed to transfer the sod from the ground to the separator housing whereby a substantial amount of the sod materials are separated and returned to the ground prior to introduction of the sod into the separator housing.

A further object of my invention is to provide apparatus for harvesting the sprigs in which the sod is removed from the ground in a continuous and even manner whereby there is no tearing of the sod as it is being removed from the ground.

A further object of my invention is to provide apparatus for harvesting sprigs in which the sprigs are separated from the sod by gravity, impact and centrifugal action as the sprigs are transferred continuously toward the discharge end of the apparatus.

A still further object of my invention is to provide apparatus for harvesting sprigs of the character designated which shall be simple of construction, economical of manufacture and one which is relatively light in weight whereby it may be supported by a conventional type tractor and moved selectively from digging position to transport position while the unit is operating, thus reducing the time required in a turn and permitting sprigs to be harvested from various types of soils.

Heretofore in the art to which my invention relates, various devices have been proposed for separating and harvesting materials from the soil. However, insofar as I am aware, such devices have been extremely heavy and complicated in structure due to the fact that there is a slow separation of dirt and the like from the materials harvested. This is especially true since such devices depend primarily upon agitation alone to separate the materials from the soil.

In accordance with my present invention, I have provided a high speed impact machine which operates in an entirely different manner from low speed agitation type machines. The sod is removed by a forwardly and downwardly extending scoop member and then transferred upwardly and rearwardly by a plurality of rotary beaters whereby the beaters serve the dual function of conveying the sod and at the same time fracturing and removing some of the sod materials from the under surface thereof. The sod is next introduced into a separator housing where the sod is engaged by high speed impact members which disintegrate the sod whereby a major portion of the sod materials are separated from the sprigs at this point, thus greatly reducing the energy required to separate the sod materials from the sprigs. After being contacted by the impact members, the sprigs are engaged by threshing elements which convey the sprigs toward the discharge end of the apparatus as the remaining sod materials are separated therefrom whereby the sprigs are in a very clean condition at the time they reach the discharge end of the apparatus.

Apparatus embodying features of my invention is illustrated in the accompanying drawings, forming a part of this application, in which.

Figure 1:
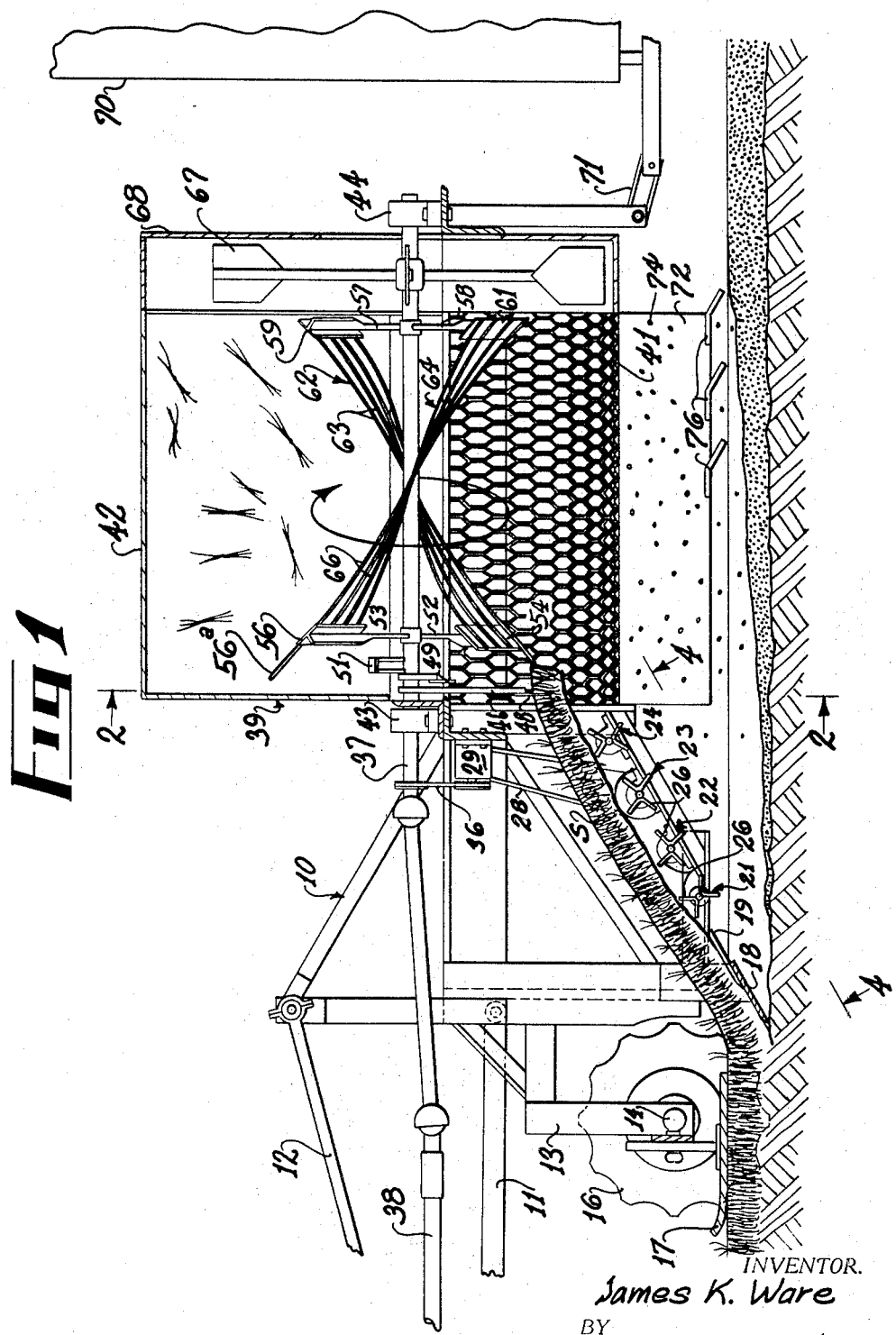
FIG. 1 is a vertical sectional view showing the apparatus in operation.

Referring now to the drawings for a better understanding of my invention, I show a translatable frame indicated generally at 10 which may be supported adjacent the rear of a conventional type tractor or the like by a three point hitch comprising lower supporting arms 11 and an upper supporting arm 12. Since the arms 11 and 12 are connected to the tractor or the like in the usual manner, no further description thereof is deemed necessary. Also, it will be apparent that other means may be employed for supporting and moving the translatable frame 10 over the ground.

Figure 3:
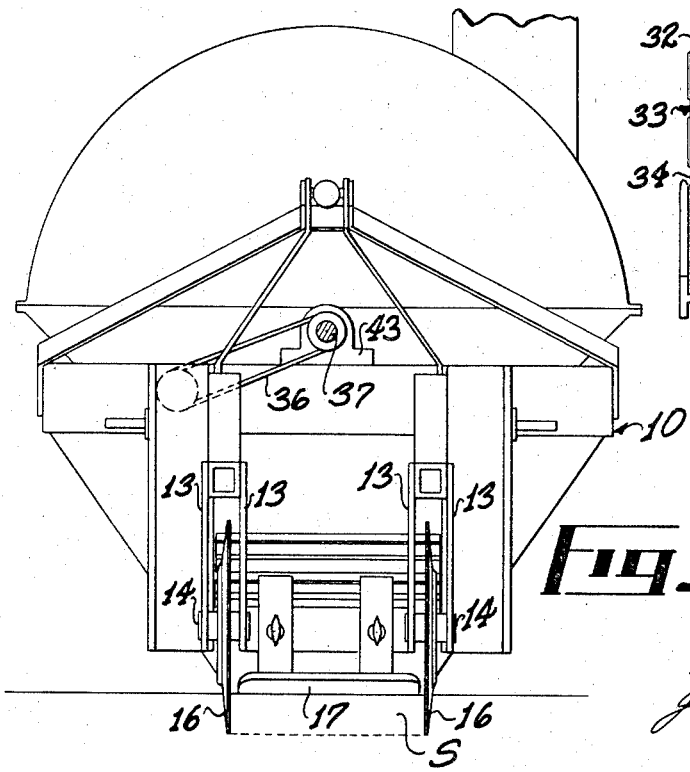
FIG. 3 is a front elevational view.
Figure 4:
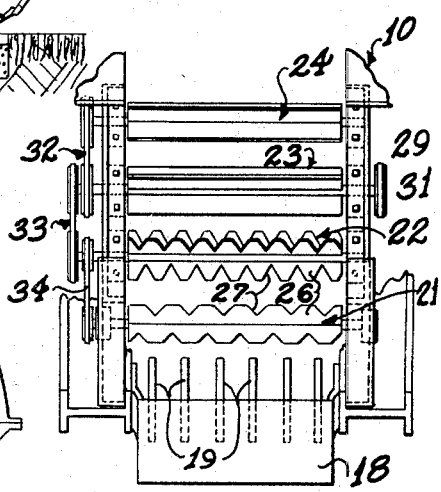
FIG. 4 is a fragmental, bottom plan view taken generally along the line 4—4 of FIG. 1.

Mounted at the forward end of the frame 10 are laterally spaced pairs of depending support members 13. As shown in FIG. 3, mounted between the lower ends of each pair of support members 13 is a stud shaft 14 which is supported for rotation in suitable bearing members. Each stud shaft 14 carries a colter 16. The colters 16 are spaced laterally from each other whereby they are adapted to cut the sod into strips indicated at S. The elevation at which the forward end of the frame 10 is supported is determined by an adjustable depth plate 17 which engages the upper surface of the sod as the apparatus is moved forwardly to thus support the forward end of frame 10. As shown in FIGS. 1 and 3, the forward edge of the depth plate 17 is turned upwardly and forwardly to facilitate movement of the plate over the ground and prevent the same from digging into the ground. It will be apparent, however, that other means may be provided to regulate the elevation of the forward end of frame 10, such as by providing a large area wheel or the like in place of the plate 17.

Mounted on the frame 10 adjacent and rearwardly of the colters 16 is an upwardly and rearwardly extending scoop 18 which is adapted to move beneath the sod S and direct the same upwardly and rearwardly. The lower edge of the scoop 18 is preferably at a level approximately the same as the lower edges of the colters 16, as shown in FIG. 1. Also, the scoop 18 is of a width equal the distance between the laterally spaced colters 16 whereby the entire strip of sod is scooped up and directed rearwardly and upwardly. Secured to and extending upwardly and rearwardly from the scoop 18 are a plurality of upwardly and rearwardly extending bars 19 which are spaced from each other to permit the return of loose soil and the like to the ground.

Mounted on the frame 10 rearwardly of the bars 19 are a plurality of elongated, rotary beaters 21, 22, 23 and 24. The rotary beaters extend transversely of the forward end of the frame 10 and are mounted for rotation in an inclined plane extending upwardly and rearwardly from the scoop 18 and the bars 19, as shown. Each elongated, rotary beater extends in a generally horizontal plane and is provided with elongated, outwardly projecting flanges 26 which engage the under surface of the strip of sod S to convey it upwardly and rearwardly. The peripheral speed of rotation of the beaters is at least as great as the linear speed of movement of the strip of sod S. Also, the lowermost rotary beaters 21 and 22 are provided with recesses 27 in the outer edges of the flanges 26 to further aid in penetrating the under surface of the sod S as it is conveyed upwardly and rearwardly. While I have shown only some of the flanges 26 as having recesses 27, the flanges may all have the recesses 27 therein or all of the flanges 26 may be straight as shown on beaters 23 and 24. Also, the overall shape of the rotary beaters is generally elliptical, as viewed in cross section, to further aid in agitating and removing loose soil and the like from the under surface of the strip of sod S. The rotary beaters are driven by a flexible drive member 28 which passes around a suitable pulley for a gear box 29 and around a pulley 31 carried by the shaft of the rotary beater 23. Rotary motion is imparted to the rotary beater 24 by a drive connection indicated generally at 32 which is also operatively connected to the drive shaft of the rotary beater 23. In like manner, a flexible drive connection 33 operatively connects the shaft of the rotary beater 23 to the shaft of rotary beater 22. The shaft of rotary beater 22 is operatively connected to the shaft of rotary beater 21 by a flexible drive 34. It will thus be seen that all of the rotary beaters 21, 22, 23 and 24 rotate in the same direction whereby the strip of sod S is conveyed upwardly and rearwardly.

Power is supplied to the gear box 29 by a flexible drive connection 36 which is operatively connected to a shaft 37 that is in turn operatively connected to a power take-off shaft 38 of a conventional type tractor or the like.

Mounted on the translatable frame 10 adjacent the rotary beater 26 in position to receive the strip of sod S is a separator housing 39 which is provided with a perforated, generally semi-cylindrical bottom wall 41 formed of expanded metal. The housing 39 is provided with an upper cover member 42 which is also generally semi-cylindrical and is imperforate to prevent the escape of materials from the housing. The perforations in the expanded metal 41 are of a size to permit the return of all of the sod materials other than the sprigs themselves to the ground. The shaft 37 is supported by suitable bearings 43 and 44 and extends through the separator housing 39, as shown in FIG. 1.

Mounted on the shaft 37 inwardly of the housing 39 are radially extending arms 46 and 47. Mounted at the ends of the arms 46 and 47 are cutter elements 48 and 49, respectively. The arms 46 and 47 are secured to the shaft 37 whereby the cutter elements 48 and 49 are spaced angularly from each other and are adapted to move transversely of the forward end of the housing to make successive cuts through the strip of sod S whereby the forward end of the sod is severed successively. The cutter elements 48 and 49 are thus mounted for rotation about a horizontal axis and are spaced axially along the shaft 37 in position to engage the sod S at the same point. The radially extending arm 47 is longer than the radially extending arm 46 whereby the cutter element 48 cuts through a portion of the thickness of the sod S while the other cutter element 49 completes the cut. The axial distance between the radially extending arms 46 and 47 is to compensate for the movement of the sod S between the time the cutter element 48 engages the sod and the time the cutter element 49 engages the sod.

Mounted on the shaft 37 adjacent the radially extending arms 46 and 47 is a counterweight 51 which is positioned to counterbalance the arms 46 and 47 whereby the apparatus is dynamically balanced.

Figure 2:
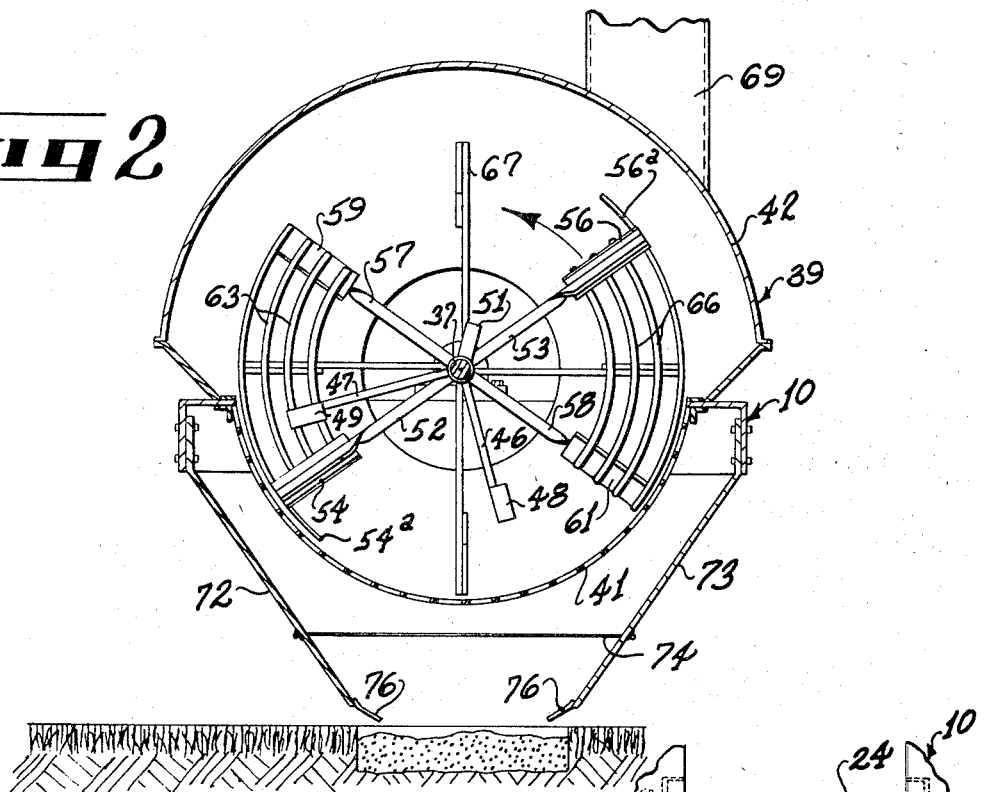
FIG. 2 is a sectional view taken generally along the line 2—2 of FIG. 1.

Mounted on the shaft 37 adjacent and inwardly of the cutter elements 48 and 49 are oppositely disposed radial arms 52 and 53. Mounted adjacent the outer ends of the arms 52 and 53 are relatively flat impact members 54 and 56, respectively. As shown in FIG. 2, the impact members 54 and 56 are mounted for rotation adjacent the inner surface of the semi-cylindrical bottom wall 41 in position to contact and disintegrate the sod S after it enters the housing 39. The impact members 54 and 56 thus separate the sprigs from the sod whereby the other sod materials pass downwardly through the perforated bottom wall 41 and are returned to the ground.

Mounted on the shaft 37 adjacent the discharge end of the housing 39 are radially extending arms 57 and 58 which also carry relatively flat plate-like members 59 and 61. Secured to and extending between the impact member 54 and the plate-like member 59 is a threshing element 62 which comprises a plurality of spaced apart bar-like members 63. In like manner, secured to and extending between the impact member 56 and the plate-like member 61 is a threshing element 64 which comprises a plurality of spaced apart bar-like members 66.

As shown in the drawings, the arms 52 and 57 are spaced angularly from each other whereby the threshing elements define members which engage and convey the sprigs rearwardly toward the discharge end of the housing 39. The threshing elements thus extend at an angle relative to the horizontal axis about which they rotate to define a conveyor which also aids in separating the sprigs from other sod materials as the sprigs are conveyed rearwardly, since I depend primarily upon impact separation of the sprigs from the sod, the impact members 54 and 56 must be rotated at a relatively high speed. In actual practice, I have found that a minimum speed ranging from 150 to 200 revolutions per minute is satisfactory in every respect to separate the sprigs from the sod. Also, I have found that at least two of the spaced apart, rod-like members 66 and 63, as the case may be, are satisfactory in every respect to convey the sprigs rearwardly and at the same time permit downward flow of the other sod materials to the perforated bottom wall 41.

Projecting forwardly of the impact members 54 and 56 are cleaner elements 54a and 56a which travel adjacent the forward portion of the bottom wall 41 to prevent build up of loose dirt and the like and thus prevent choking and buckling of the sod sheet.

Mounted on the shaft 37 adjacent the rear end of the housing 39 is a fan blower 67 which rotates in a discharge housing 68. The housing 68 has a suitable discharge conduit 69 whereby the sprigs may be blown over into a suitable translatable receptacle, a fragment of which is shown at 70. The receptacle 70 is operatively connected to the rear end of the frame 10 by a connection 71 whereby it may be towed.

Mounted on the frame 10 and extending downwardly and inwardly from opposite sides of the semi-cylindrical bottom wall 41 are deflector plates 72 and 73. To prevent the lower ends of the deflector plates 72 and 73 from spreading outwardly as the sod materials are conveyed downwardly therethrough, I connect the deflector plates to each other by rod-like members 74. As shown in FIG. 2, the lower ends of the deflector plates 72 and 73 are spaced from each other a distance equal to the width of the strip of sod S removed from the ground. Accordingly, dirt and other sod materials, other than the sprigs, are conveyed into the cavity from which the sod was removed. To aid further in the distribution of the sod materials returned to the ground, I provide inwardly and rearwardly extending finger elements 76 along the lower edges of the deflector members 72 and 73. The finger elements 76 prevent the materials from piling up alongside the edges of the cavity left in the soil and at the same time deflect the materials toward the center of the cavity in the soil. The finger elements 76 also prevent spill-over at the rear of the deflector plates 72 and 73 whereby the area from which the sod is removed is left in a substantially level condition after the sod is removed therefrom.

From the foregoing description, the operation of my improved apparatus for harvesting sprigs will be readily understood. As the frame 10 is moved forward, the colters 16 cut the sod into a strip S, the depth of the cut being determined by the plate 17. The scoop 18 passes beneath the cut strip of sod S and deflects the same upwardly and rearwardly whereupon the sod passes over the spaced apart bars 19 and the rotary beaters 21, 22, 23 and 24, whereupon the soil initially separated from the sod is returned to the ground prior to movement of the sod into the housing 39. Upon entering the housing 39, the cutter element 48 cuts through approximately one-half the width of the sod, as shown in FIG. 1. By positioning the cutter element 48 axially forward of the cutter element 49 and at an angular distance relative to the cutter element 49, the cutter element 49 engages the sod at the same point that the cutter element 48 engaged the sod whereby the cut is complete. That is, the arm 47 being longer than the arm 46, the cutter element 49 makes a deeper cut to completely sever the sod. Accordingly, the forward end of the sod S is severed successively and it is introduced continuously into the receiving end of the housing 39.

Immediately upon being severed, the sod is engaged by the impact members 54 and 56 whereby the sod is disintegrated by impact to separate the sprigs from the remainder of the sod materials. The sod materials other than sprigs then fall downwardly and pass the perforated bottom wall 41, whereupon they are returned to the ground. Any sod materials clinging to the sprigs after engagement by the impact members 54 and 56 is removed as the sprigs are continuously engaged by the threshing elements 62 and 64 as the sprigs are conveyed rearwardly toward the discharge end of the housing 39. Accordingly, the dirt and other sod materials are separated from the sprigs by the centrifugal action and impact imparted by the threshing elements and by gravity whereby a complete separation of the sprigs from other sod materials is obtained.

After separation from the other sod materials, the sprigs are conveyed by the blower fan 67 through conduit 69 into the receptacle 70. The inwardly extending fingers 76 adjacent the lower ends of the deflector plates 72 and 73 cause the soil and sod materials to be returned to the cavity in the ground in an even manner whereby there is no spill-over at the rear of the deflector plates 72 and 73.

From the foregoing, it will be seen that I have devised improved apparatus for harvesting sprigs. By separating the sprigs from the sod by a high speed, impact operation, a minimum of energy is required to disintegrate the sod and at the same time substantially all of the sod materials are separated from the sprigs by impact. Also, by providing the threshing elements in combination with the impact members, the loose soil and other materials are all removed from the sprigs as the sprigs are conveyed toward the discharge end of the housing. The provision of the expanded metal bottom wall 41 assures clean separation of the sprigs from the sod materials whereby all sod materials except the springs are returned to the soil. Furthermore, the provision of the inwardly extending fingers in combination with the downwardly and inwardly extending deflector plates causes the dirt and other sod materials to be returned to the cavity from which the sod was removed in an even manner whereby the field is left in a level condition after the sod is removed therefrom.

While I have shown my invention in but one form, it will be obvious to those skilled in the art that it is not so limited, but is susceptible of various changes and modifications without departing from the spirit thereof.

What I claim is:

1. In apparatus for harvesting sprigs from sod:
   (a) a translatable frame,
   (b) a downwardly and forwardly extending scoop carried by said frame in position to pass beneath a strip of sod and convey said strip upwardly and rearwardly upon forward movement of said frame,
   (c) a plurality of elongated rotary beaters extending transversely of the forward end of said frame and mounted for rotation in an inclined plane extending upwardly and rearwardly from said scoop,
   (d) means to rotate said beaters in a direction to convey said strip of sod upwardly and rearwardly from said scoop,
   (e) a housing mounted on said frame rearwardly of said beaters with its forward end in position to receive said strip of sod and having an upper cover member and a perforated, generally semi-cylindrical bottom wall,
   (f) impact members mounted for rotation within said housing adjacent the inner surface of said semi-cylindrical bottom wall in position to contact and disintegrate the sod after it enters said housing and separate by impact the sprigs from other sod materials whereby said other sod materials pass through said perforated bottom wall,
   (g) at least one threshing element mounted for rotation about a generally horizontal axis and extending at an angle relative to said horizontal axis in position to engage and convey the sprigs rearwardly, and
   (h) discharge means adjacent the rear end of said housing to remove the sprigs therefrom.

2. In apparatus for harvesting sprigs as defined in claim 1 in which the downwardly and forwardly extending scoop carries upwardly and rearwardly extending bar-like members which are spaced laterally from each other whereby dirt and the like initially separated from the sod is removed and at least one colter is carried by the forward end of said frame forwardly of said scoop in position to cut the sod into a continuous strip.

3. In apparatus for harvesting sprigs as defined in claim 1 in which each elongated rotary beater extends in a generally horizontal plane and is provided with elongated outwardly projecting flanges which engage the under surface of the strip of sod to convey it upwardly and rearwardly, the peripheral speed of the beaters being at least as great as the linear speed of the strip of sod.

4. In apparatus for harvesting sprigs as defined in claim 1 in which cleaner elements project forwardly of said impact members in position to move adjacent the forward inner surface of said bottom wall.

5. In apparatus for harvesting sprigs as defined in claim 1 in which cutter means is mounted for movement transversely of the forward end of said housing and is operable to make successive cuts through the strip of sod whereby the forward end of the sod is severed successively.

6. In apparatus for harvesting sprigs as defined in claim 5 in which the cutter means comprise angularly spaced cutter elements mounted for rotation about a horizontal axis and spaced axially along said axis in position for said cutter elements to engage the sod at the same point, said cutter elements being of a length for one cutter element to cut through a portion of the thickness of said sod while another cutter element completes the cut.

7. In apparatus for harvesting sprigs as defined in claim 1 in which the impact members rotate at a minimum speed ranging from 150 to 200 revolutions per minute.

8. In apparatus for harvesting sprigs as defined in claim 1 in which the impact members are flat members carried by radially extending arms mounted for rotation about an axis coincident with the axis of rotation of said threshing elements.

9. In apparatus for harvesting sprigs as defined in claim 1 in which the impact members are mounted non-rotatably on a generally horizontal shaft and angularly spaced threshing elements are carried by said impact members with each threshing element comprising at least two spaced apart rod-like members.

10. In apparatus for harvesting sprigs as defined in claim 1 in which the discharge means comprises a discharge fan mounted for rotation adjacent the discharge end of said housing, the axis of rotation of said fan being coincident with the axis of rotation of the threshing element.

11. In apparatus for harvesting sprigs as defined in claim 1 in which said semi-cylindrical bottom wall is expanded metal.

12. In apparatus for harvesting sprigs as defined in claim 1 in which downwardly and inwardly extending deflector plates are carried by said frame adjacent opposite sides of said perforated bottom wall, the lower ends of said deflector plates being spaced from each other a distance equal substantially the width of the strip of sod removed, and inwardly and rearwardly extending fingers are carried by the lower ends of said deflector plates.

References Cited

UNITED STATES PATENTS

| 32,183 | 4/1861 | Conover | 171—128 XR |
| 41,371 | 1/1864 | Foley | 172—20 |
| 317,792 | 5/1885 | Hoyt | 171—116 XR |

FOREIGN PATENTS 951,398  10/1956  Germany.

ABRAHAM G. STONE, *Primary Examiner.*

J. PETERSON, *Assistant Examiner.*